United States Patent
Gray

(10) Patent No.: US 6,481,152 B1
(45) Date of Patent: Nov. 19, 2002

(54) MOSQUITO TRAP

(76) Inventor: Pamela Gray, 2516 Tahoe Dr., Ontario, CA (US) 91761

( * ) Notice: Subject to any disclaimer, the term of this patent is extended or adjusted under 35 U.S.C. 154(b) by 0 days.

(21) Appl. No.: 10/056,506

(22) Filed: Jan. 25, 2002

(51) Int. Cl.[7] .............................. A01M 1/04; A01M 1/14
(52) U.S. Cl. .......................................... 43/113; 43/114
(58) Field of Search ................................... 43/113, 114

(56) References Cited

U.S. PATENT DOCUMENTS

| | | | | |
|---|---|---|---|---|
| 449,138 | A | * 3/1891 | Roth | 43/113 |
| 550,345 | A | * 11/1895 | Humphreys et al. | 43/113 |
| 1,182,389 | A | * 5/1916 | Levine | 43/113 |
| 2,305,898 | A | * 12/1942 | Richter et al. | 43/113 |
| 4,168,591 | A | * 9/1979 | Shaw | 43/114 |
| 4,654,998 | A | * 4/1987 | Clay | 43/113 |
| 5,203,816 | A | * 4/1993 | Townsend | 43/113 |
| 5,231,790 | A | * 8/1993 | Dryden et al. | 43/113 |
| RE34,402 | E | * 10/1993 | Williams | 43/113 |
| 5,251,397 | A | * 10/1993 | Exum et al. | 43/113 |
| 5,425,197 | A | * 6/1995 | Smith | 43/113 |
| 5,608,987 | A | * 3/1997 | Meyer | 43/113 |
| 5,915,948 | A | * 6/1999 | Kunze et al. | 43/113 |
| 6,327,811 | B1 | * 12/2001 | Yamaguchi et al. | 43/114 |

FOREIGN PATENT DOCUMENTS

| | | | | |
|---|---|---|---|---|
| DE | 169968 | B1 | * 6/1951 | 43/113 |
| DE | 3840440 | B1 | * 10/1989 | |
| FR | 422209 | B1 | * 3/1911 | 43/113 |
| FR | 2428973 | B1 | * 2/1980 | 43/113 |
| GB | 20798 | B1 | * 12/1908 | 43/113 |
| GB | 2144020 | B1 | * 2/1985 | |
| JP | 64-55137 | B1 | * 3/1989 | |
| JP | 8-33444 | B1 | * 2/1996 | |
| JP | 8-47361 | B1 | * 2/1996 | |
| JP | 2001-269105 | B1 | * 10/2001 | |

* cited by examiner

Primary Examiner—Darren W. Ark
(74) Attorney, Agent, or Firm—Goldstein & Lavas, P.C.

(57) ABSTRACT

A mosquito trap that will effectively trap mosquitoes as they invade a persons home to allow for their easy disposal including a base member having an upper end and a lower end. The upper end has a light socket formed therein. A fluorescent bulb is adapted for coupling with the light socket of the base member. A translucent cover member is adapted for coupling with the base member over the fluorescent bulb. A sleeve member is adapted for being removably coupled with the cover member. The sleeve member has a sticky substance disposed on an entirety thereof.

2 Claims, 2 Drawing Sheets

MOSQUITO TRAP

BACKGROUND OF THE INVENTION

The invention relates to a mosquito trap that will effectively trap mosquitoes as they invade a persons home to allow for their easy disposal.

Typical insect trapping devices usually attract insects and the like thereto, only to kill the insects whereupon the insects will be strewn about requiring someone to clean them up. What is needed is a device that can kill mosquitos and insects in such a manner as to reduce or negate the required clean-up of the dead insects.

The present invention attempts to solve the abovementioned problem by providing a mosquito trap that will effectively trap mosquitoes as they invade a persons home to allow for their easy disposal. Additionally, the present invention will negate any clean-up of dead insects.

Several references show various insect trap devices. U.S. Pat. No. 5,203,816 to Townsend discloses an electronic flea trap comprised of a tubular transparent device with a light and a sticky substance on the outside for immobilizing the insects. U.S. Pat. No. 5,231,790 to Dryden discloses a flea trap comprised of an illumination source inside a transparent tube with an adhesive sheet on the outside. U.S. Pat. No. 5,915,948 to Kunze discloses an insect trap comprised of a light source and an adhesive board for immunizing the insects.

While these units may be suitable for the particular purpose employed, or for general use, they would not be as suitable for the purposes of the present invention as disclosed hereafter.

SUMMARY OF THE INVENTION

It is an object of the invention to produce a mosquito trap for indoors or outside that will effectively trap mosquitoes as they invade a persons home to allow for their easy disposal including a base member having a generally frustoconical configuration. The base member has a narrow upper end and a wide lower end. The narrow upper end has a light socket formed therein. The light socket has a power cord extending outwardly from the base member for coupling with a standard electrical socket. The narrow upper end has an annular recess disposed around the light socket. A tubular fluorescent bulb is adapted for coupling with the light socket of the base member. A tubular translucent cover member is adapted for coupling with the base member over the fluorescent bulb. The cover member has an open lower end and closed upper end. The open lower end has an annular flange extending downwardly therefrom. The annular flange is received within the annular recess of the narrow upper end of the base member. A sleeve member is adapted for being removably coupled with the cover member. The sleeve member has a sticky substance disposed on an entirety thereof.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
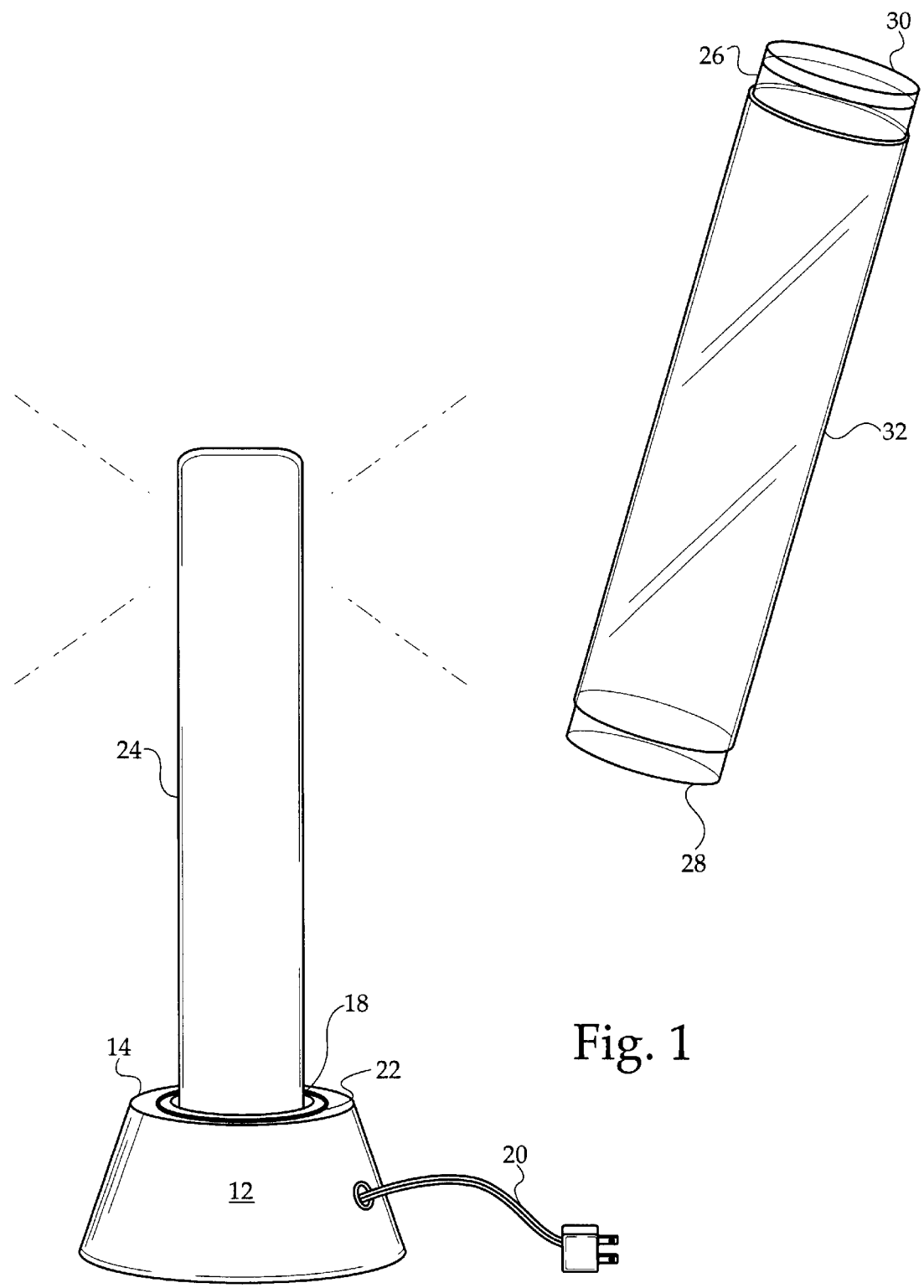
FIG. 1 is an exploded perspective view of the present invention.
Figure 2:
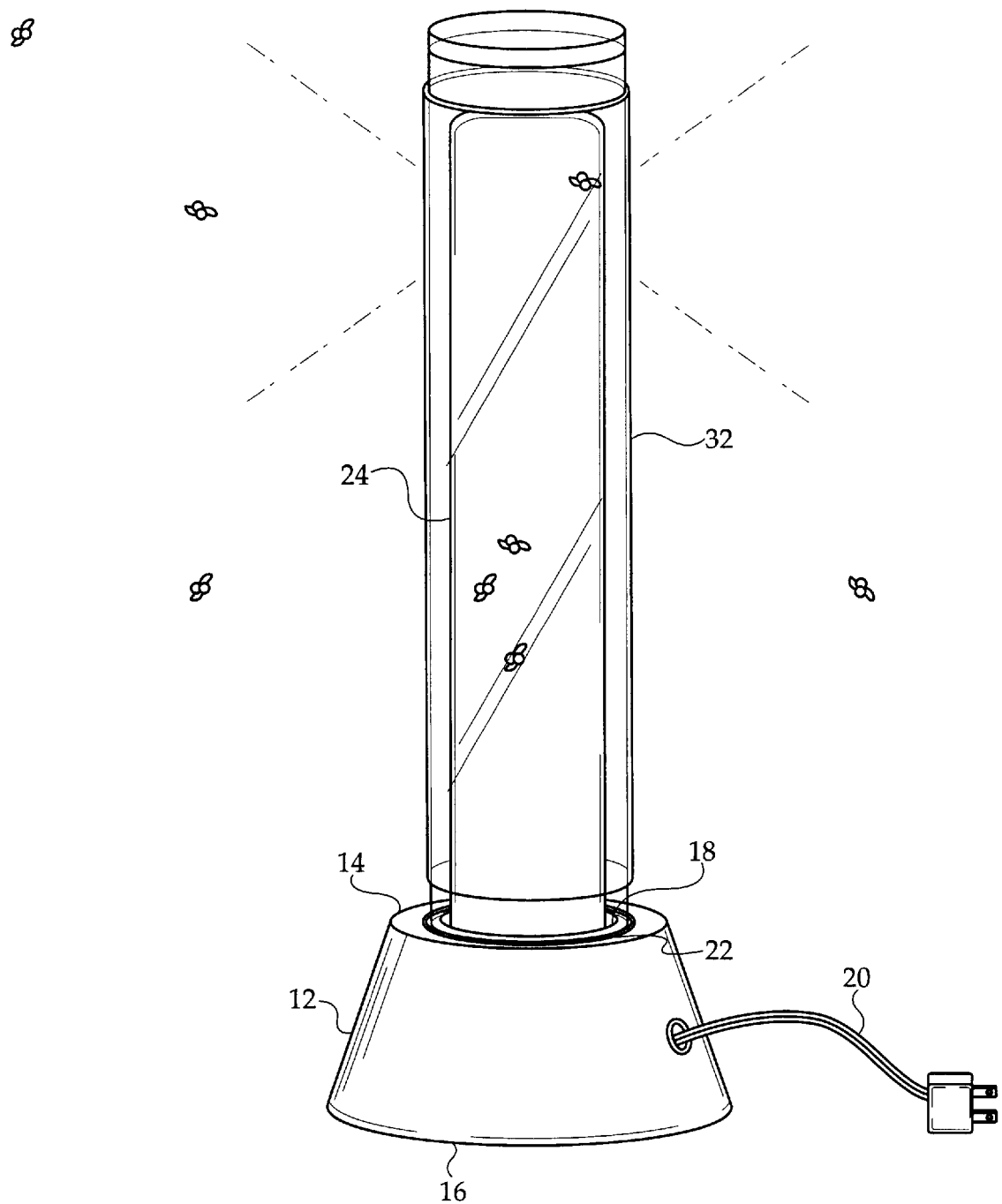
FIG. 2 is an elevated front view of the present invention illustrated in use.

It will be noted in the various figures that the device relates to a mosquito trap that will effectively trap mosquitoes as they invade a persons home to allow for their easy disposal. In its broadest context, the device consists of a base member, a tubular fluorescent bulb, a tubular translucent cover member, and a sleeve member. Such components are individually configured and correlated with respect to each other so as to attain the desired objective.

The base member 12 has a generally frustoconical configuration. The base member 12 has a narrow upper end 14 and a wide lower end 16. The wide lower end 16 will be positionable on a recipient surface whereby the added width thereof will provide stabilization for the present invention. The narrow upper end 14 has a light socket 18 formed therein. The light socket 18 has a power cord 20 extending outwardly from the base member 12 for coupling with a standard electrical socket. Alternate power means could be utilized to power the present invention. The narrow upper end 14 has an annular recess 22 disposed around the light socket 18.

The tubular fluorescent bulb 24 is adapted for coupling with the light socket 18 of the base member 12.

The tubular translucent cover member 26 is adapted for coupling with the base member 12 over the fluorescent bulb 24. The cover member 26 has an open lower end 28 and closed upper end 30. The open lower end 28 is received within the annular recess 22 of the narrow upper end 14 of the base member 12.

The sleeve member 32 is adapted for being removably coupled with the cover member 26. The sleeve member 32 has a sticky substance disposed on an outer surface thereof. The sleeve member 32 is also translucent to allow the fluorescent bulb 24 to be seen there through.

In use, the activation of the fluorescent bulb 24 will cause mosquitoes and other insects to swarm towards the present invention. The mosquitoes will fly directly at the bulb 24 only to be trapped by the sticky substance of the sleeve member 32. The sleeve member 32 can then be removed after a period of time and replaced.

What is claimed is:

1. A mosquito trap that will effectively trap mosquitoes as they invade a persons home to allow for their easy disposal, comprising, in combination:

a base member having an upper end and a lower end, the upper end having a light socket formed therein;

a fluorescent bulb adapted for coupling with the light socket of the base member;

a translucent cover member adapted for coupling with the base member over the fluorescent bulb, the cover member having an open lower end and a closed upper end, the open lower end being received within an annular recess formed in the upper end of the base member; and a sleeve member adapted for being removably coupled with the cover member, the sleeve member having a sticky substance disposed on an entirety thereof.

2. A mosquito trap for indoors that will effectively trap mosquitoes as they invade a persons home to allow for their easy disposal, comprising, in combination:

a base member having a generally frustoconical configuration, the base member having a narrow upper end and a wide lower end, the narrow upper end having a light socket formed therein, the light socket having a power cord extending outwardly from the base member for coupling with a standard electrical socket, the narrow upper end having an annular recess disposed around the light socket;

a tubular fluorescent bulb adapted for coupling with the light socket of the base member;

a tubular translucent cover member adapted for coupling with the base member over the fluorescent bulb, the cover member having an open lower end and closed upper end, the open lower end being received within the annular recess of the narrow upper end of the base member; and a sleeve member adapted for being removably coupled with the cover member, the sleeve member having a sticky substance disposed on an entirety thereof.

* * * * *